United States Patent [19]

Mills et al.

[11] Patent Number: 5,202,961
[45] Date of Patent: Apr. 13, 1993

[54] SEQUENTIAL INFORMATION CONTROLLER

[75] Inventors: Michael Mills; Jonathan Cohen, both of San Francisco; Yin Y. Wong, Cupertino, all of Calif.; Ian S. Small, Toronto, Canada

[73] Assignee: Apple Computer, Inc., Cupertino, Calif.

[21] Appl. No.: 536,913

[22] Filed: Jun. 8, 1990

[51] Int. Cl.$^5$ ............................................. G06F 15/40
[52] U.S. Cl. ................................. 395/159; 395/161; 395/155; 340/747
[58] Field of Search .............. 364/518, 519, 521, 522; 340/747, 750; 395/155, 159, 161

[56] References Cited

U.S. PATENT DOCUMENTS

| | | | |
|---|---|---|---|
| 4,715,008 | 12/1987 | Jones | 364/563 |
| 4,789,962 | 12/1988 | Berry et al. | 364/900 |
| 4,890,249 | 12/1989 | Yen | 364/578 |
| 4,922,238 | 5/1990 | Aoki et al. | 340/726 |
| 4,933,881 | 6/1990 | Schmidt | 364/525 |
| 4,954,966 | 9/1990 | Mooney et al. | 364/518 |

Primary Examiner—Gary V. Harkcom
Assistant Examiner—Phu K. Nguyen

[57] ABSTRACT

A sequential information controller for use in combination with a computer comprising a slider bar, integrating standard velocity and direction indicators, and a control icon. The user controls the playback velocity and direction of the sequential information, such as video information, on the display of the computer through an interactive user interface, which works in combination with the computer's system software. The interface includes an interactive slider bar and an interactive control icon which are depicted within an operating window of the display. The slider bar includes both playback direction/velocity indicators and control buttons. The playback of video information is primarily controlled by manipulating the image of the control icon with respect to the image of the slider bar. The image of the control icon is that of a human-like hand, which holds the slider bar image in either its open or closed hand, depending on the desired playback mode, and can be moved along the length of the slider bar image by a control device, such as a mouse, to control the playback direction and velocity of the video information on the display. When the control icon's hand is open, the control icon is spring loaded from the stop playback position of the slider bar. To keep the control icon from automatically returning to the stop playback position when the control icon's hand is open, the user must continue to hold the control icon in position with the mouse. When the control icon's hand is closed, the control icon will remain at any position along the slider bar it is placed, until moved by operation of the mouse, or until returned to the spring-loaded mode and released by the mouse, thereby allowing it to spring back to the stop position. The mode of the control icon is modulated by positioning the cursor over the control icon, selecting the control icon, and moving the cursor either up or down. Moving the cursor down, when the hand is open, closes the hand and freezes the playback velocity at the speed selected when the hand was closed. Moving the cursor up, when the hand is closed, opens the hand and spring loads the control icon. The control icon can also be rapidly moved to different positions by simply clicking on the slide bar with the mouse, regardless of the mode of operation.

45 Claims, 5 Drawing Sheets

SEQUENTIAL INFORMATION CONTROLLER

FIELD OF THE INVENTION

The present invention relates generally to computerized sequential information controllers, such as video playback and editing devices, and more particularly to a novel method and apparatus for controlling the playback direction and velocity of any type of sequential information, such as portions of video information.

BRIEF DESCRIPTION OF PRIOR ART

Many computerized sequential information or data controllers, such as video playback and editing systems, allow a user to preview large chunks of analog or digital audio and/or video information stored in one or more different types of devices, such as VCRs, optical disc players, and audio players. A user typically regulates the direction and velocity at which the video information is displayed through use of software or hardware controls, such as a "jog-shuttle" potentiometer (a device which causes the forward or backward display velocity of the video information to increase or decrease depending on the particular direction, and how far, the jog-shuttle's control knob is turned).

In recent years, many of these computerized video viewing and/or editing systems have replaced manual controls like the jog-shuttle with soft-ware-based tools that allow the user to regulate the same functions through operation of a cursor control device, such as a mouse. An example of a prior art software tool is a one-state slider tool developed at the Multimedia Laboratory of the Massachusetts Institute of Technology. The MIT slider is depicted together with the video information on the same display screen of a computer when in use. The slider tool consists of an elongated slider bar image having a small spring-loaded control line image which can be grabbed by a user with a mouse and dragged in either a forward or reverse play direction along the slider bar to control playback velocity. While the control line is being held in a particular position, the video information is played in the desired direction and at a velocity corresponding to the position of the control line along the slider bar. When the control line is released, it springs back to a central position of the slider bar, thereby causing playback of the video information to stop.

Another control technique is to use software radio buttons, which can be utilized to control the direction and velocity at which video information is played back in much the same manner that hardware buttons on tape players and VCRs control operating functions such as stop, step forward, forward, fast-forward, step reverse, reverse, and fast-reverse. In prior art systems, a radio button corresponding to each of these functions is displayed on the display with the video information, but such radio buttons are separate from any slider tools which also might be utilized. The function associated with a radio button is carried out when the radio button is selected by the mouse.

SUMMARY OF THE INVENTION

A preferred embodiment of the sequential information controller of the present invention comprises a video playback direction and velocity controller for use in combination with a computer and a video input device, such as a video cassette recorder (VCR), camera, or optical disc player. The controller regulates the playback of video information on the display of the computer through an interactive user interface, which works in combination with the computer's system software. The interface includes an interactive slider bar and an interactive control icon which are depicted within an operating window of the display. The slider bar includes both playback direction/velocity indicators and control buttons. The playback of video information is primarily controlled by manipulating the image of the control icon with respect to the image of the slider bar. The image of the control icon is that of a human-like hand, which holds the slider bar image in either its open or closed hand, depending on the desired playback mode, and can be moved along the length of the slider bar image by a control device, such as a mouse, to control the playback direction and velocity of the video information on the display. When the control icon's hand is open, the control icon is spring loaded from the stop playback position of the slider bar. To keep the control icon from automatically returning to the stop playback position when the control icon's hand is open, the user must continue to hold the control icon in position with the mouse. When the control icon's hand is closed, the control icon will remain at any position along the slider bar it is placed, until moved by operation of the mouse, or until returned to the spring-loaded mode and released by the mouse, thereby allowing it to spring back to the stop position.

The mode of the control icon is modulated by positioning the cursor over the control icon, selecting the control icon, and moving the cursor either up or down. Moving the cursor down, when the hand is open, closes the hand and freezes the playback velocity at the speed selected when the hand was closed. Moving the cursor up, when the hand is closed, opens the hand and spring loads the control icon. The control icon can also be rapidly moved to different positions by simply clicking on the slide bar with the mouse, regardless of the mode of operation.

The present invention offers numerous advantages over the prior art. First, the present invention is an improvement over stand-alone radio buttons because it allows the user to select playback velocity settings in between those offered by the radio buttons. Second, the present invention is an improvement over stand-alone, one-state sliders because the user doesn't need to guess to select standard velocity settings and because the user has the option of holding the control icon in position to maintain a desired playback velocity or setting the control icon in fixed position to select a desired playback velocity. Third, the present invention is an improvement over jog-shuttle potentiometers because it can be spring-loaded to return to the stop position when released and it offers numerous standard velocity settings which can be readily selected by the user. These and other advantages of the present invention will no doubt become apparent to those skilled in the art after having read the following detailed disclosure of a preferred embodiment of the present invention which is illustrated in the several figures of the drawing.

DETAILED DESCRIPTION OF PREFERRED EMBODIMENT

Figure 1:
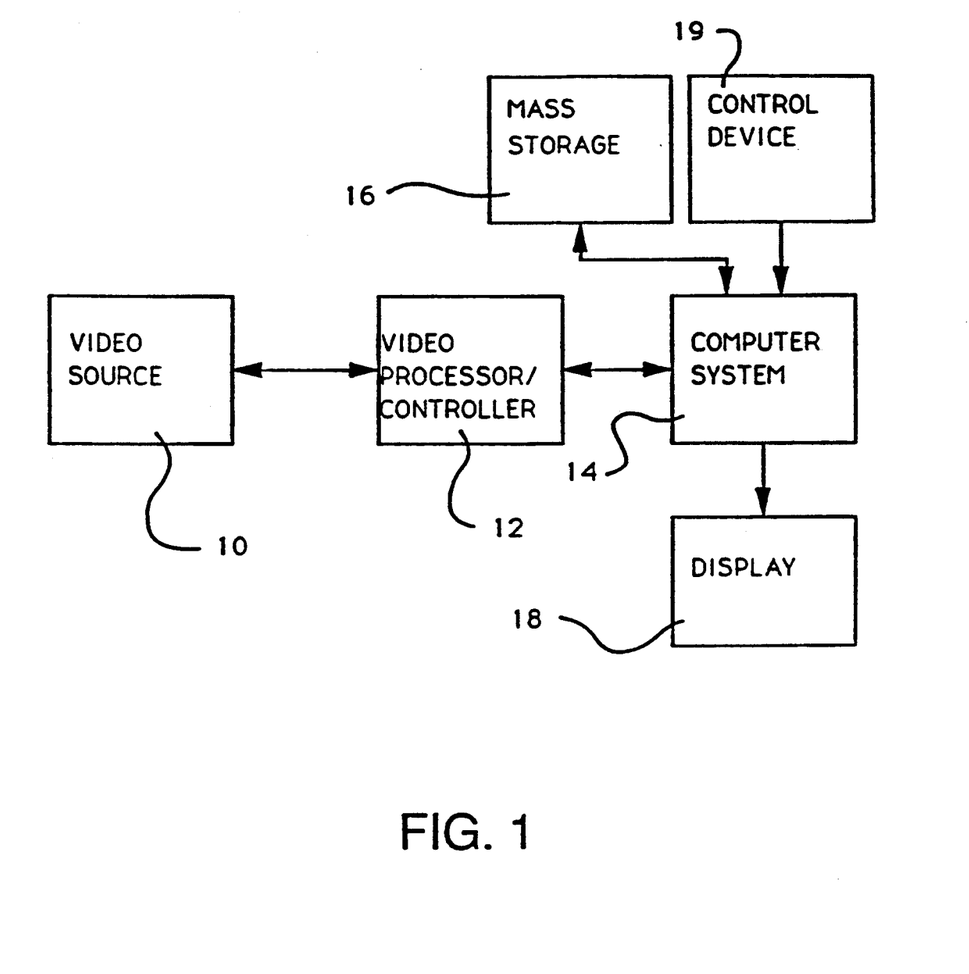
FIG. 1 is a block diagram representing a video editing system in accordance with the preferred embodiment of the present invention.

In general, with reference to FIG. 1, a viewing or editing system for use in combination with the present invention is shown comprising a video source 10, a video processor/controller 12, and a computer system 14. The computer system 14 includes or is in communication with a mass storage device 16, a display device 18, and a control device 19, and could also include the video processor/controller 12 as an add-on board connected to its motherboard. Video information from the video source 10 is communicated to the video processor/controller 12 for conversion to digital signals, if necessary, and output to the computer system 14, where it is either displayed on the display 18 or stored in the memory of the mass storage device 16. Although the present invention is described as being used to control the display of video information, it could also be used in a similar manner to control the playback of any type of sequential visual or audio information, or even as a throttle control for an engine or other type of device which would require a linear controller to regulate the flow of fuel or other product (generically referred to as information from hereon) and would benefit from having fixed and tentative (springback) controller operating modes.

The type of computer system to be utilized in combination with the present invention is unlimited and includes any one of a broad range of different types of computers, although computer systems utilizing graphical user interfaces, such as the Macintosh ® computer manufactured by Apple Computer, Inc., of Cupertino, Calif., are preferred. The computer system should typically include appropriate hardware and software for communicating with and/or controlling the source of the audio or visual information. The type of video source 10 to be utilized is likewise unlimited and can also be any of a large number of different types of devices, such as a video cassette recorder, optical disc player, certain types of video cameras, etc. It should also be noted that the controller of the present invention can be used to either control the actual operation of the video source (and therefore the playback of video information), through the computer system 14 and/or video processor/controller 12, or the playback of video information already stored in either the memory of the computer or the mass storage device 16.

Figure 2:
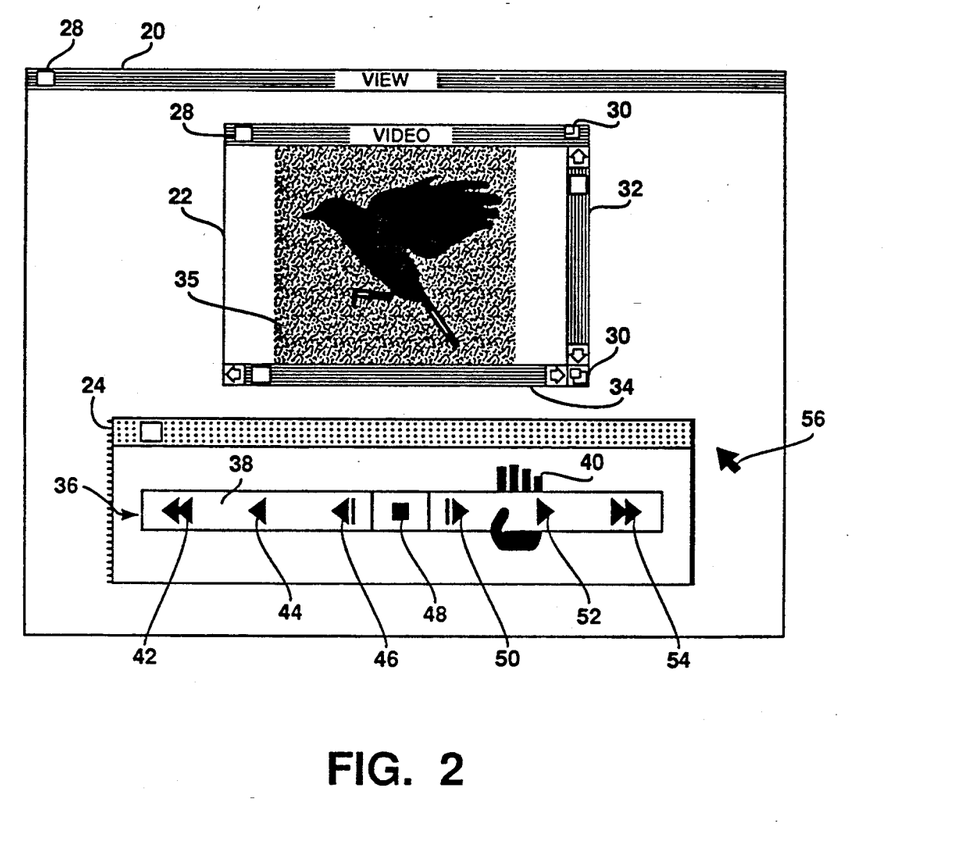
FIG. 2 is a representation of a video window and a control window as each might appear on the display of a computer system utilizing the preferred embodiment of the present invention.

With reference now to FIG. 2, the basic operation of the editing system and the controller will be illustrated. Upon initialization of the computer system 14 and the computer's system software, the user is presented with a number of operating windows on the computer system's display 18, such as the view window 20, video window 22, and control window 24. In some computer systems, such as the Macintosh ® computer, the user will also be presented with certain functional icons which allow the user to conveniently perform certain tasks within the computer without having to type in written commands. Each window of the computer also typically includes a close box 28 for closing the window when it is through being used, size boxes 30 for changing the size of the window, vertical scroll bars 32 for scrolling the images within the window up and down, and horizontal scroll bars 34 for scrolling the images within the window sideways. The techniques for creating functional icons and operating windows are well known in the art and need not be described here for an enabling disclosure of the present invention See, Apple Computer, Inc., Inside Macintosh, Vols. I, II, and III, (1985), Addison-Wesley Publishing Company, Inc.

To display video information 35 from the video source 10 in the video window 22 of the general view window 20, the user must first indicate to the computer system 14 the type of video source to be utilized (i.e., VCR or laser-disc player) and the name and/or location of the desired video information to be displayed (i.e., the starting frame position or the title of the section of information to be edited). Once this task has been accomplished, the user can then control the display of the video information 35 through operation of the control device 19, such as a mouse, trackball, keyboard, touch screen, or any type of X-Y axis input device. The controller 36, which is operated by the control device 19, is shown generally within the control window 24. The controller 36 includes an interactive control icon 40 and an interactive slider bar 38 having a bar-shaped control dial, standard playback direction/velocity indicators, and a number of control buttons corresponding to the position of the playback direction/velocity indicators, including standard playback indicators and control buttons corresponding to fast-reverse 42, reverse play, 44, step-reverse 46, stop 48, step-forward 50, forward play 52, and fast-forward 54.

In the preferred embodiment of the present invention, the image of the control icon 40 is that of a human-like hand which holds the image of the slider bar in either its open or closed hand, depending on the desired playback mode of the controller (such as the tentative-set or fixed-set states further described below). The control icon 40 is moved along the length of the slider bar 38 by operation of the control device 19. The control icon 40 is typically manipulated by the well known technique of positioning the cursor 56 over the control icon (or similar type of graphic object depicted on the display), selecting the control icon either with the selection button of the control device 19 or a keyboard command equivalent, and dragging the control icon 40 along the slider bar 38 to a new position. It should be noted, however, that this method of manipulating the position of the control icon 40 is by no means exclusive, since the position of the control icon 40 could also be manipulated in a wide variety of manners depending on the type of computer system utilized and the types of peripheral control devices and software available.

Although the control icon 40 is depicted and described as a humanlike hand, it is important to note that the control icon 40 could have any of a wide variety of different designs or appearances. Preferably, the design of the control icon 40 should be such that it aids the user in determining the present operating mode or state of the controller, such as by depicting one shape when operating in one state, and depicting a different shape when operating in a different state. If so desired, however, the icon could also be designed to have a single iconic image regardless of its operating state, but in such situations, some additional step should generally be taken to indicate the controller's state (i.e., changing the color of the slider bar when a state change occurs).

Figure 3:
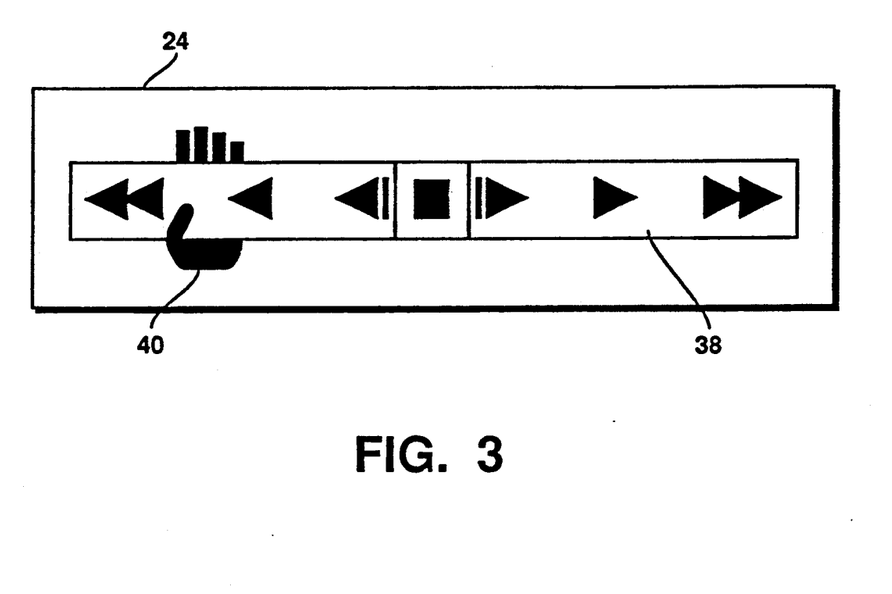
FIG. 3 is a representation of a control window illustrating the set mode of the present invention.

The open-hand control icon 40 depicted in FIG. 2 indicates that the controller is being operated in its tentative-set state. The controller is said to be operating in a tentative-set mode or state when the control icon's hand is open because the user can only temporarily set the playback direction and velocity of the video information (i.e., the control icon is spring loaded from the stop playback position 48 of the slider bar 38 and will automatically return to the stop playback position as soon as the user releases the control icon with the control device). To keep the control icon 40 from automatically returning to the stop playback position 48, the user must continue to hold the control icon 40 in position with the control device 19, or switch the operating mode of the controller to what is referred to as the fixed-set state. When the control icon's hand is closed, as illustrated in FIG. 3, the controller is said to be operating in a fixed-set mode or state because the position of the control icon 40 along the slider bar 38 remains fixed until the control icon is again moved by operation of the control device 19, or until the control icon is returned to its tentative-set state and released by the control device 19, thereby allowing it to spring back to the stop position 48. Hence, when the control icon 40 is operated in its closed-hand mode or fixed-set state, the control icon's position, and therefore the playback direction/velocity of the video information 35, remains fixed, until changed by further operation of the control device 19.

The position of the control icon 40, and therefore the playback direction/velocity of the video information, can also be rapidly changed, regardless of the controller's operating mode or state, by simply clicking (with the control device) on a different position on the slider bar 38. When a click is detected on the slider bar 38, the control icon is moved to the newly selected position and the playback direction and velocity are set accordingly. If the controller is operating in the tentative-set mode at the time of the click, the user will have to continue selecting the control icon (i.e., holding down on the selection button of the mouse), or switch the controller over to its fixed-set state, to keep the control icon at the selected position. If the controller is operating in the fixed-set mode at the time of the click, the control icon 40 will simply move to and stay at that selected position.

This particular feature works well in combination with the control buttons of the slider bar to quickly and accurately set a specific playback direction/velocity for the video information. Each control button of the slider bar 38 has an interactive display region, such as the region immediately surrounding one of the playback indicators, which is responsive to the position of the cursor 56. When the cursor 56 is moved to a position within one of these display regions and the selection button associated with the control device is activated, the controller is immediately commanded to perform a predetermined action, such as to move the control icon 40 to a position on the slider bar corresponding to the display region and to set an appropriate playback direction and velocity. For example, if a user wanted to playback the video information 35 at the standard, forward play velocity, the user need only click on the forward play indicator 52 to move the control icon to that position, thereby causing the controller to move the control icon to that position and to set a playback direction and velocity corresponding to that indicator. The control buttons associated with the indicators 42 to 54 are most appropriately set up as radio buttons so that only one button out of the group of buttons can be active at one time. The areas of the slider bar between the interactive regions associated with the indicators function to indicate velocity gradations between the specific velocities associated with each control button along the slider bar 38 in each particular direction. Hence, if the user would like to set the forward playback velocity somewhere between the velocity associated with forward play indicator 52 and the velocity associated with fast-forward play indicator 54, the user need only click on the slider bar at, or move the control icon to, a position on the slider bar between the two indicators.

The operating state or mode of the controller, and hence the image of the control icon 40, can also be changed in a simple intuitive manner, which will be further described below. The controller's operating mode can be changed at anytime by selecting the control icon 40 and moving the cursor 56 either up or down by a sufficient amount. Moving the cursor 56 down, when the hand is open, closes the hand and freezes the playback velocity at the speed selected when the hand was closed. Moving the cursor 56 up, when the hand is closed, opens the hand and spring loads the control icon.

Figure 4:
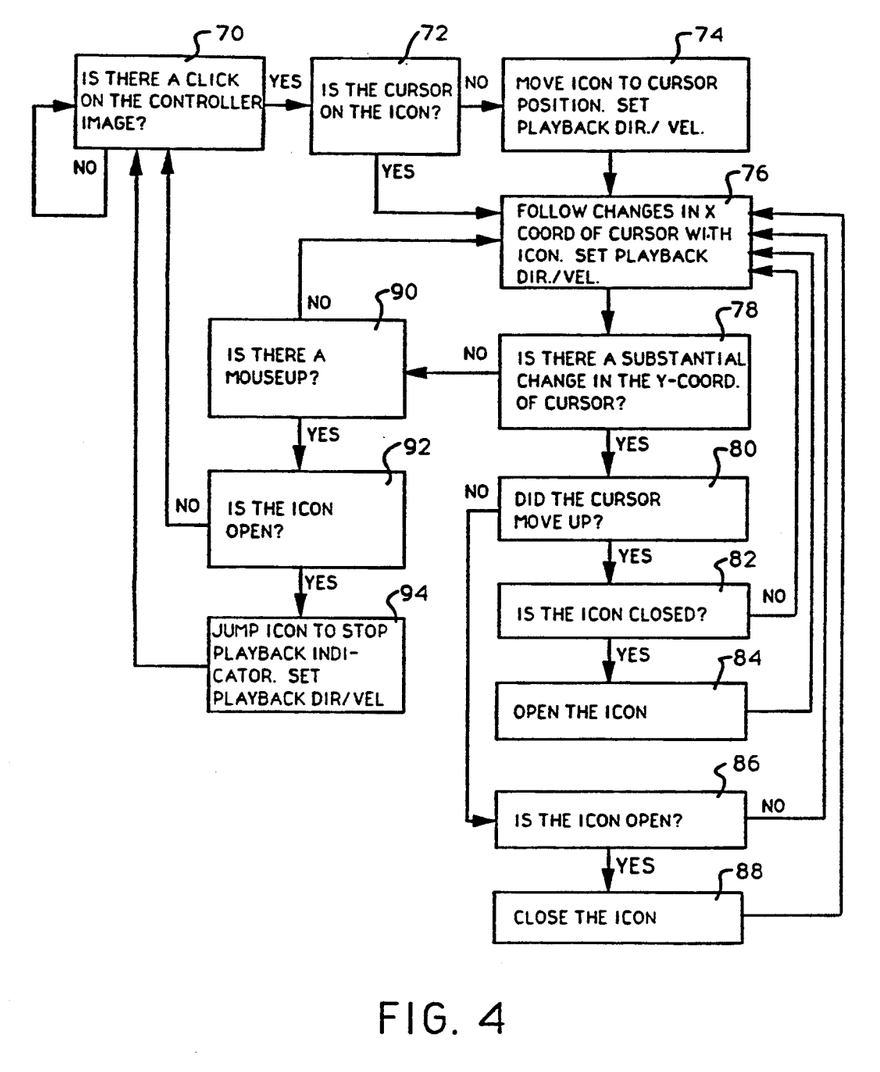
FIG. 4 illustrates methods for changing the position of the control icon with respect to the slider bar and for modulating the operating state of the controller in accordance with the preferred embodiment of the present invention.
Figure 5:
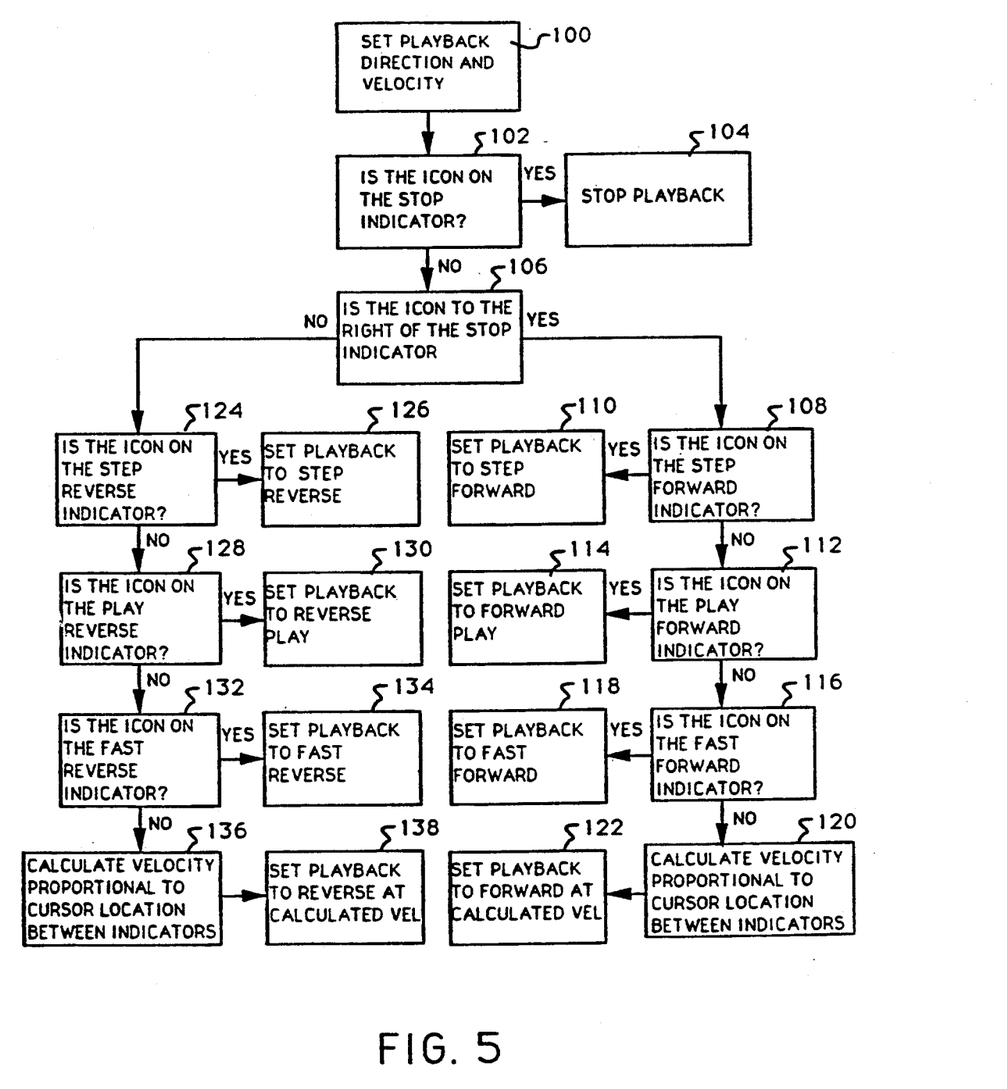
FIG. 5 illustrates a method for setting the playback direction/velocity of displayed video information according to the position of the control icon along the slider bar in accordance with a preferred embodiment of the present invention.

The operation of the controller can be further explained with reference now to FIGS. 4 and 5. The flow chart of FIG. 4 illustrates methods for changing the position of the control icon 40 with respect to the slider bar 38 and for modulating the operating state of the controller. The flow chart of FIG. 5 illustrates a method for setting the playback direction/velocity of displayed video information 35 according to the position of the control icon 40 along the slider bar 38.

As is illustrated in FIG. 4, upon initialization of the controller system, the controller is first prompted to look for a click (i.e., a mouse down command or selection command) somewhere on the controller image (meaning both the slider bar 38 and the control icon 40), block 70. When a click on the controller image is detected, the controller is first prompted, block 72, to determine if the cursor 56 is positioned over the control icon 40, or the slider bar 38. If the click occurred on the slider bar 38, then the controller is prompted, block 74, to move the control icon 40 to the position of the cursor 56 on the slider bar 38 and to set the playback direction/velocity accordingly. Once the control icon 40 has been set in block 74, or if the click occurred on the control icon, the controller is prompted, block 76, to follow changes in the X-coordinate position of the cursor 56 with the control icon 40 and to set the playback direction/velocity accordingly.

After setting the playback direction/velocity, the controller is then prompted, block 78, to determine whether any substantial change in the Y-coordinate position of the cursor 56 has occurred, thereby indicating a state change command. What is considered to be a substantial change is a matter of choice, but some latitude in the movement of the Y-coordinate position should be allowed so that the controller doesn't change modes too readily when the user is moving the control icon along the slider bar (i.e., the Y-coordinate position of the control icon should be allowed to change more without prompting a state change command when there is movement in the X-coordinate position of the control icon than would be the case if there was no movement in the X-coordinate position of the control icon). If a substantial change in the Y-coordinate position of the control icon 40 occurs, the controller is prompted, block 80, to determine whether the cursor has moved up or moved down. Based on the answer to that prompt of block 80, the controller is then prompted, blocks 82 and 86, to determine whether the control icon is in the tentative-set or fixed-set operating state. If the hand of the control icon 40 is closed, block 82, the controller's operating mode is changed to the tentative-set state and the hand of the control icon 40 is opened, block 84. Likewise, if the controller is in the tentative-set state (control icon hand open), block 86, the controller is prompted, block 88, to change operating state (close the hand of the control icon).

If no actionable change occurs in either the X or Y-coordinate position of the cursor, the controller is prompted, block 90, to look for the occurrence of a mouseup command, which is generally caused by the release of the selection button of a mouse after a click, although other types of appropriate action could likewise be substituted. Since a mouseup command indicates that the user has either decided to leave the control icon at its present position or to let the control icon return to the stop playback indicator, the controller is then prompted, block 92, to determine whether the controller is in its tentative-set state or fixed-set state. If the controller is in its fixed-set state, the control icon and playback direction/velocity are left where last positioned or set and the controller is prompted to return to block 70. If the controller is in its tentative-set state (the control icon's hand is open), the controller is prompted, block 94, to return the control icon 40 to the stop playback indicator, stop playback of the video information, and return to block 70.

As directed by blocks 74, 76 and 94 of FIG. 4, FIG. 5 illustrates a method, block 100, for setting the playback direction/velocity of the displayed video information. If the control icon (cursor) is positioned within the display region of the stop playback indicator 48, block 102, the controller is prompted to stop playback of the video information, block 104. If the control icon is to the right of the stop indicator, block 106, the controller is prompted to determine whether the playback velocity should be set to a corresponding standard playback velocity. If the control icon is positioned within the display region of the step-forward indicator 50, block 108, the controller is prompted, block 110, to set the playback velocity at the step-forward rate. If the control icon is positioned within the display region of the forward play indicator 52, block 112, the controller is prompted, block 114, to set the playback velocity at the forward play rate. If the control icon is positioned within the display region of the fast forward indicator 54, block 116, the controller is prompted, block 118, to set the playback velocity at the fast-forward rate. If the control icon is determined to not be positioned within any of the display regions of the standard forward playback indicators, the controller is prompted, block 120, to calculate the playback velocity of the video information as a proportion of the control icon's position between adjacent playback indicators, and to set the playback velocity at the calculated velocity, block 122.

A similar sequence of steps are followed if the control icon is determined to be positioned to the left of the stop playback indicator 48. If the control icon is positioned within the display region of the step-reverse indicator 46, block 124, the controller is prompted, block 126, to set the playback velocity at the step-reverse rate. If the control icon is positioned within the display region of the reverse play indicator 44, block 128, the controller is prompted, block 130, to set the playback velocity at the reverse play rate. If the control icon is positioned within the display region of the fast-reverse indicator 42, block 132, the controller is prompted, block 134, to set the playback velocity at the fast-reverse rate. If the control icon is determined to not be positioned within any of the display regions of the standard reverse playback indicators, the controller is prompted, block 136, to calculate the playback velocity of the video information as a proportion of the control icon's position between adjacent playback indicators, and to set the reverse playback velocity at the calculated velocity, block 138.

Although the present invention has been described with reference to FIGS. 1–5 and with emphasis on a particular embodiment, it should be understood that the figures and processes are for illustration of a preferred embodiment of the present invention only and should not be taken as limitations or thought to be the only means of carrying out the present invention. For example, although the control icon of the preferred embodiment moves in a horizontal direction along the slider bar so that the cursor must be moved vertically to control the operating mode, the slider bar could just as easily be rotated by ninety degrees so that control icon motion is vertical and the cursor must be moved horizontally to change the operating mode (as would be preferable in certain types of applications, or where the horizontal screen space on the display was a valued commodity). Hence, it is contemplated that many such changes and modifications may be made to the present invention without departing from the spirit and scope of the invention as disclosed above.

We claim:

1. A controller for use in combination with a display system and a user operable control device for producing control signals for regulating the flow direction and the flow velocity of sequential information, said control device including means for selecting and manipulating images on a display of said display system, the means for selecting and manipulating images including a button, the controller comprising:

an interactive slide indicator responsive to said control device for indicating an available range of selectable flow directions and selectable flow velocities for said sequential information, said slide indicator including means for generating a slide indicator image on said display corresponding to said available range;

an interactive control icon responsive to said control device for selecting a selected flow direction and a selected flow velocity for said sequential information from said available range, said control icon including means for generating a control icon image on said display over said slide indicator image, said control icon image being operative to be moved by said control device to a selected position along said slide indicator image corresponding to the selected flow direction and the selected flow velocity for said sequential information, the selected flow velocity and the selected flow direction being selected in a one of a tentative set mode and a fixed set mode, in the tentative set mode the selected flow velocity and the selected flow direction being continuously variable according to the selected position of the control icon image while the button is in a one of two button states, in the fixed set mode the selected flow velocity and the selected flow direction being independent of control icon image position, said tentative set mode an said fixed set mode being alternatively selectable through operation of said control device; and means for detecting the presence of said control icon image at said selected position and for generating said control signals corresponding to said selected flow direction and said selected flow velocity for use in regulating the flow of said sequential information.

2. A controller as recited in claim 1, wherein said slide indicator includes at least one interactive control dial for indicating a range of gradational flow velocities for said sequential information in a predetermined flow direction and includes at least one interactive control button for indicating a predetermined flow velocity for said sequential information in said predetermined flow direction, wherein said control icon image is operative to be moved to said selected position in response to said control dial being selected by said control device, and wherein said control icon image is operative to be moved to said selected position in response to said control button being selected by said control device.

3. A controller as recited in claim 2, wherein said slide indicator includes a plurality of said control buttons, and wherein said control buttons are radio buttons.

4. A controller as recited in claim 1, wherein said slide indicator image has a first region for indicating a zero flow velocity for said sequential information, and a second region contiguous to said first region for indicating a forward flow velocity of said sequential information.

5. A controller as recited in claim 4, and further including a third region contiguous to said first region for indicating a backward flow velocity of said sequential information.

6. A controller as recited in claim 5, wherein said slide indicator includes at least one interactive control dial for indicating a range of gradational flow velocities for said sequential information in a predetermined flow direction and includes at least one interactive control button for indicating a predetermined flow velocity for said sequential information in said predetermined flow direction, wherein said control icon image is operative to be moved to said selected position in response to said control dial being selected by said control device, and wherein said control icon image is operative to be moved to said selected position in response to said control button being selected by said control device.

7. A controller as recited in claim 6, wherein said first region includes one of said interactive control buttons, wherein said second region includes one of said control dials, and wherein said third region includes one of said control dials.

8. A controller as recited in claim 7, wherein said control buttons are radio buttons, wherein said second region further includes a plurality of said radio buttons, and wherein said third region further includes a plurality of said radio buttons.

9. A controller as recited in claim 1, wherein said control icon image includes a first image when said control icon is operating in said tentative set mode and wherein said control icon image includes a second image when said control icon is operating in said fixed set mode.

10. A controller as recited in claim 9, wherein said slide indicator includes at least one interactive control dial for indicating a range of gradational flow velocities for said sequential information in a predetermined flow direction and includes at least one interactive control button for indicating a predetermined flow velocity for said sequential information in said predetermined flow direction, wherein said control icon image is operative to be moved to said selected position in response to said control dial being selected by said control device, and wherein said control icon image is operative to be moved to said selected position in response to said control button being selected by said control device.

11. A controller as recited in claim 10, wherein said slide indicator image has a first region for indicating a zero flow velocity for said sequential information, and a second region contiguous to said first region for indicating a forward flow velocity of said sequential information.

12. A controller as recited in claim 11, and further including a third region contiguous to said first region for indicating a backward flow velocity of said sequential information.

13. A controller as recited in claim 12, wherein said first region includes one of said interactive control buttons, wherein said second region includes one of said control dials, and wherein said third region includes one of said control dials.

14. A controller for producing control signals for use in regulating the flow of sequential information, comprising:

a first means for indicating a range of selectable flow directions and flow velocities for said sequential information;

a second means responsive to a user for choosing a selection position from said range of selectable flow directions and flow velocities, said selection position corresponding to a selected flow direction and a selected means for operating in a first mode for tentatively maintaining said selection position, means for operating in a second mode for fixedly maintaining said selection position, and means for switching between said first and second modes while maintaining said selection position; and a third means responsive to said second means for detecting said selection position and producing said control signals for regulating the flow of said sequential information as selected by said second means in said selected flow direction and at said selected flow velocity.

15. A controller as recited in claim 14, wherein said first means includes a slide indicator having at least one interactive control dial for indicating a range of gradational flow velocities for said sequential information in a predetermined flow direction and having at least one interactive control button for indicating a predetermined flow velocity for said sequential information in said predetermined flow direction.

16. A controller as recited in claim 15, wherein said slide indicator includes a plurality of said control buttons, and wherein said control buttons are radio buttons.

17. A controller as recited in claim 14, wherein said first means includes a slide indicator having a first region for indicating a zero flow velocity for said sequential information, and a second region contiguous to said first region for indicating a forward flow velocity for said sequential information.

18. A controller as recited in claim 17, and further including a third region contiguous to said first region for indicating a backward flow velocity of said sequential information.

19. A controller as recited in claim 18, wherein said slide indicator includes at least one interactive control dial for indicating a range of gradational flow velocities for said sequential information in a predetermined flow direction and includes at least one interactive control button for indicating said predetermined flow velocity for said sequential information in a predetermined flow direction.

20. A controller as recited in claim 19, wherein said first region includes one of said interactive control buttons, wherein said second region includes one of said control dials and a plurality of said control buttons, and wherein said third region includes one of said control dials and a plurality of said control buttons.

21. A controller as recited in claim 17, wherein said control buttons are radio buttons.

22. A controller as recited in claim 14, wherein said controller is used in combination with a display system and a user operable control device including means for selecting and manipulating images on a display of said display system, wherein said first means includes means for generating an interactive slide indicator image portraying said range on said display, and wherein said second means further includes means for generating an interactive control icon image on said display visually proximate to said slide indicator image, said control icon image being operative to be moved by said control device to said selected position along said slide indicator image, said third means being operative to detect the position of said control icon image along said slide indicator image as said selection position and to generate said control signals corresponding to said selected flow direction and said selected flow velocity for use in regulating the flow of said sequential information.

23. A controller as recited in claim 22, wherein said control icon image has a first image when said second means is operating in said first mode and wherein said control icon image has a second image when said second means is operating in said second mode.

24. A controller as recited in claim 22, wherein said first means includes at least one interactive control dial for indicating a range of gradational flow velocities for said sequential information in a predetermined flow direction and includes at least one interactive control button for indicating a predetermined flow velocity for said sequential information in said predetermined flow direction.

25. A controller as recited in claim 22, wherein said slide indicator image has a first region for indicating a zero flow velocity for said sequential information, and a second region contiguous to said first region for indicating a forward flow velocity for said sequential information.

26. A controller as recited in claim 25, and further including a third region contiguous to said first region for indicating a backward flow velocity of said sequential information.

27. A controller as recited in claim 26, wherein said first means includes at least one interactive control dial for indicating a range of gradational flow velocities for said sequential information in a predetermined flow direction and includes one or more interactive control buttons for indicating a predetermined flow velocity for said sequential information in said predetermined flow direction.

28. A controller as recited in claim 27, wherein said first region includes one of said interactive control buttons, wherein said second region includes one of said control dials, and wherein said third region includes one of said control dials.

29. A controller for use in combination with a display system and a user operable control device for producing control signals for regulating the flow direction and the flow velocity of sequential information, said control device including means for selecting and manipulating images on a display of said display system, comprising:

a first means for generating an interactive controller image for display on said display, said controller image including a plurality of selectable markers and a slide indicator, each said marker corresponding to a predetermined flow velocity for said sequential information in a predetermined flow direction, said slide indicator corresponding to a range of gradational flow velocities for said sequential information in one or more predetermined flow directions;

a second means responsive to a user for selecting a selection position along said controller image corresponding to a selected flow direction and a selected flow velocity for said sequential information; and a third means responsive to said second means for detecting said selection position and generating said control signals for regulating the flow of said sequential information as selected by said second means in said selected flow direction and at said selected flow velocity, said second means having a first operating mode, a second operating mode, and a third operating mode, said third means being operative to tentatively generate said control signals in response to said first operating mode, said third means being operative to fixedly generate said control signals in response to said second operating mode, said third operating mode being operative to switch between said first operating mode and said second operating mode while said third means continues to generate said control signals.

30. A controller as recited in claim 29, wherein said slide indicator includes at least one interactive control dial representing said range of gradational flow velocities, and wherein each of said markers includes at least one interactive control button representing a predetermined flow velocity and a predetermined flow direction.

31. A controller as recited in claim 30, wherein said slide indicator includes a first region corresponding to a zero flow velocity for said sequential information, and a second region contiguous to said first region corresponding to a forward range of gradational flow velocities for said sequential information.

32. A controller as recited in claim 31, and further including a third region contiguous to said first region corresponding to a backward range of gradational flow velocities for said sequential information.

33. A controller as recited in claim 32, wherein said first region includes one of said interactive control buttons, wherein said second region includes one of said control dials and a plurality of said control buttons, and wherein said third region includes one of said control dials and a plurality of said control buttons.

34. A controller as recited in claim 33, wherein said control buttons are radio buttons.

35. A controller as recited in claim 29, wherein said second means further includes means for generating an interactive control icon for display on said display visually proximate to said slide indicator, said control icon being operative to be moved by said control device to said selection position along said slide indicator, said third means being operative to detect the position of said control icon along said slide indicator as said selection position and to generate said control signals corresponding to said selected flow direction and said selected flow velocity for use in regulating the flow of said sequential information.

36. A controller as recited in claim 35, wherein said control icon has a first image when said second means is operating in said first mode and wherein said control icon has a second image when said second means is operating in said second mode.

37. A controller as recited in claim 35, wherein said slide indicator includes at least one interactive control dial representing said range of gradational flow velocities for said sequential information in one of said predetermined flow directions and includes at least one interactive control button representing said predetermined flow velocity for said sequential information in one of said predetermined flow directions.

38. A controller as recited in claim 35, wherein said slide indicator includes a first region corresponding to a zero flow velocity for said sequential information, and a second region contiguous to said first region corresponding to a forward range of gradational flow velocities for said sequential information.

39. A controller as recited in claim 38, and further including a third region contiguous to said first region corresponding to a backward range of gradational flow velocities for said sequential information.

40. A controller as recited in claim 38, wherein said slide indicator includes at least one interactive control dial representing said range of gradational flow velocities for said sequential information in one of said predetermined flow directions and includes one or more interactive control buttons representing said predetermined flow velocity for said sequential information in one of said predetermined flow directions.

41. A controller as recited in claim 40, wherein said first region includes one of said interactive control buttons, wherein said second region includes one of said control dials, and wherein said third region includes one of said control dials.

42. A method for producing control signals for controlling the flow of sequential information, comprising the steps of:
   selecting a flow operation mode for the flow of the sequential information, said flow operation mode including a tentative flow operation mode for controlling the flow of said sequential information according to a position of a control icon image while a selecting means of a control device is in a one of two states, on a temporary basis and a fixed flow operation mode for maintaining a fixed flow of said sequential information;
   selecting a selected flow direction and a selected flow velocity for the sequential information; and
   producing control signals for regulating the flow of the sequential information in accordance with the selected flow direction and the selected flow velocity.

43. The method of claim 42, and further including the steps of
   displaying a controller image on a display of a display system, said controller image having a slider bar denoting selectable flow directions and selectable flow velocities for said sequential information, and having a control icon for use in selecting said flow operation mode, said flow direction and said flow velocity.

44. The method of claim 43, wherein said control icon has a first image when said tentative flow operation mode is selected and a second image when said fixed flow operation mode is selected, and wherein said step of selecting said flow operation mode includes the step of selecting said first image to select said tentative flow operation mode and selecting said second image to select said fixed flow operation mode.

45. The method of claim 44, wherein said step of selecting said flow direction and said flow velocity includes the step of moving said control icon to a selected position of said slider bar corresponding to said flow direction and said flow velocity and regulating the flow of the sequential information accordingly.

* * * * *